United States Patent [19]
Coates

[11] 3,834,745
[45] Sept. 10, 1974

[54] PROPPING DEVICE FOR OUTDOOR STOVES

[76] Inventor: Richard H. Coates, 10 Fremont Ter., Livingston, N.J. 07039

[22] Filed: Oct. 2, 1972

[21] Appl. No.: 294,248

[52] U.S. Cl. ............................... 292/339, 126/9 B
[51] Int. Cl. ......................................... E05c 17/54
[58] Field of Search ............ 292/288, 339; 248/407, 248/351, 354 R; 126/25 R, 25 A, 9 B

[56] References Cited
UNITED STATES PATENTS

| | | | |
|---|---|---|---|
| 2,126,201 | 8/1938 | McCall | 126/9 B |
| 2,506,508 | 5/1950 | Kmita | 292/339 X |
| 2,973,217 | 2/1961 | Gregoire | 292/339 X |
| 3,180,668 | 4/1965 | Brown | 292/288 X |
| 3,379,401 | 4/1968 | Pellegrino | 248/407 |
| 3,438,364 | 4/1949 | Galloway, Jr. | 126/25 R |

Primary Examiner—Carroll B. Dority, Jr.
Assistant Examiner—Harold Joyce
Attorney, Agent, or Firm—Stefan J. Klauber

[57] ABSTRACT

A propping device for supporting the hinged cover of a ceramic radiator-type cooking stove at a partially opened position. The device includes an oblongated propping body provided at one end thereof with a cradle portion adapted to receive the front rim of either the cover or of the underlying stove section. The opposite end of the propping body may adjoin a baseplate which engages the alternate rim of the stove; or this opposite end may include a second cradle portion for engaging the alternate rim. A handle extends outwardly from the propping body and terminates at a non-heat conducting portion, enabling manipulation of the device by a user. The propping body may be selectively adjustable in length, as to enable stove openings of desired dimensions.

2 Claims, 9 Drawing Figures

PATENTED SEP 10 1974 3,834,745
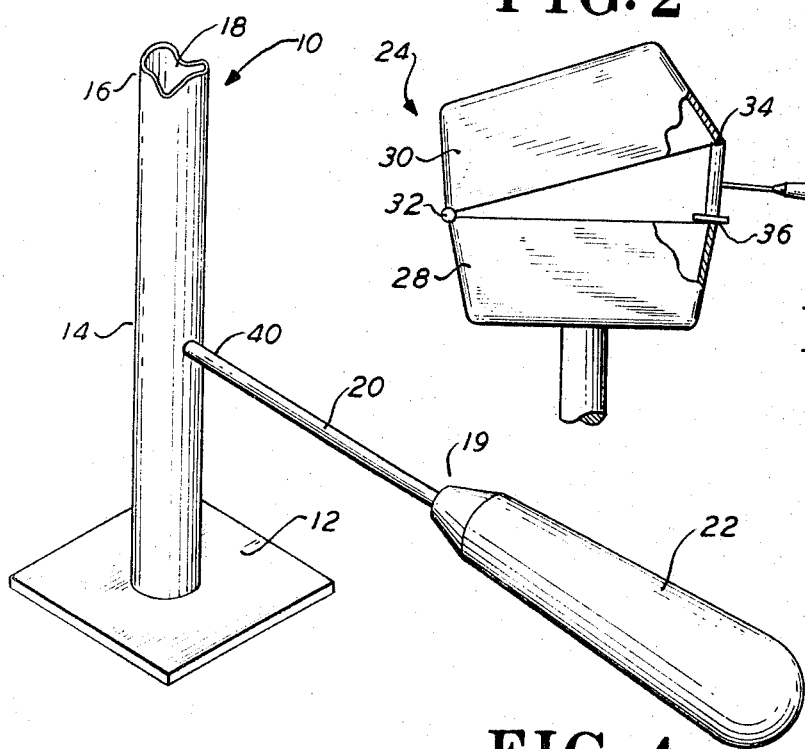
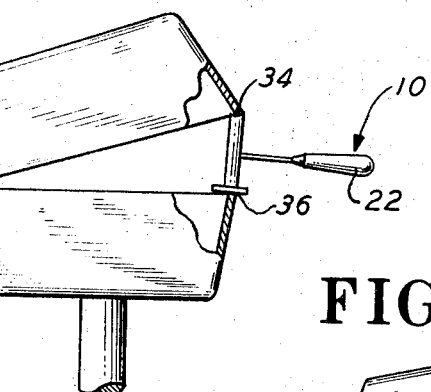
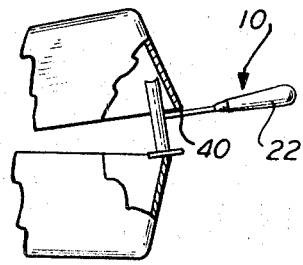
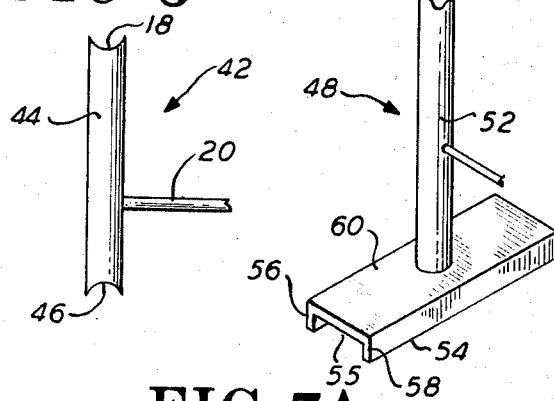
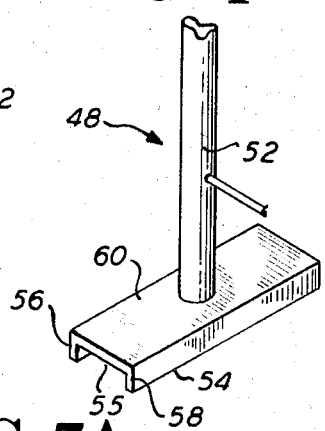
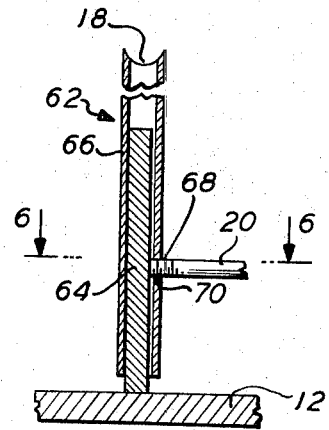
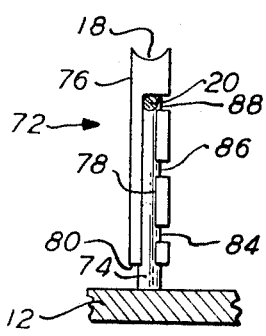
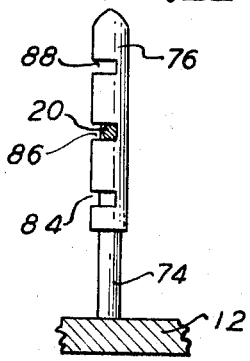
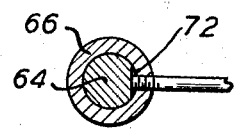

PROPPING DEVICE FOR OUTDOOR STOVES

BACKGROUND OF INVENTION

This invention relates generally to outdoor cooking stoves, and more specifically relates to barbeque stoves, particularly of the gas or electrically heated ceramic radiator type.

Within recent years the common charcoal-heated picnic stove has been supplemented or replaced for use about the home, by gas-fired or electrically heated barbeque stoves, which are more or less permanently installed at the homeowner's premises. In their most common form these devices include a sturdy base which is permanently affixed to a patio or similar area of the property owner's premises, a stove section secured atop the support base, and a cover which is commonly hinged at the rear to the said stove section. Unlike the relatively lightweight charcoal-heated stoves which these devices have largely replaced, these permanently installed devices are intended for subjection to weather elements over the course of many years, and are of correspondingly very sturdy and long-lasting construction. Commonly, for example, both the stove section and overlying cover comprise a heavyweight cast aluminum — a fact which becomes evident to the user upon lifting of the massive cover.

Considering a gas-fired apparatus as being representative of the type of device treated by the present invention, it may be noted that during use thereof a gas feed stream is provided to a flame grid at the bottom of the stove section. The generated flame serves to heat an overlying bed of ceramic rocks which then constitutes a radiant source of cooking heat. During the course of use in cooking, it has, in the past, generally been contemplated that apparatus of this type may be utilized in one of two configurations. In particular, for most grilling purposes the relatively massive cover is placed in a completely open position. This is found to be necessary for such grilling operations in that a relatively massive circulation of air is necessary in order firstly to promote proper charring of the meat, and, secondly, to limit uncontrolled fat fires. Where, however, a roasting or basting-type environment is sought, as for example, where a rotary spit is to be employed in the enclosed volume, the said cover is placed in a closed position. (Under these conditions, limited air circulation occurs through vents adjoining the cooking volume.) Such position promotes a very high heat level within the enclosed space, but is found to be unsatisfactory for the grilling of steaks, chops, or the like, since fat fires tend to occur.

In point of fact, it has been found through trial-and-error experimentation by users thereof, that stoves of the aforementioned type yield superior results during use in grilling, where the cover element is maintained at an intermediate, ajar position, that is, in a slightly open position. The reasons for this are not completely clear, but it is speculated that several factors may be involved. Among other things, superior air circulation is provided at the area of actual cooking; while at the same time a much higher heat concentration is enabled in such cooking area than is possible where the cover is in a completely open position. Under such slightly ajar conditions, the blackened inner surface of the cover becomes highly heated, and in turn serves as a secondary source of radiant heat for that side of the meat being cooked which is non-adjacent the flame. It may, incidentally, be noted in this connection, that the results achieved when cooking is effected with the cover in a slightly ajar position, far exceeds in quality those achieved in stove configurations utilizing auxiliary means to provide aeration, as for example, auxiliary vents at the top of the cover.

In the past, the more or less chance discovery by users of the superior results achieved by cooking with the cover of the aforementioned device ajar, has been implemented by makeshift and unsatisfactory means. For example, a user may position a handy rock or other object in such manner as to prop the cover in an ajar position. The result, however, is completely unsatisfactory in that the element thus used normally does not provide a sturdy support for the extremely massive cover, and moreover itself becomes rapidly heated to a point where handling thereof is exceedingly dangerous. Neither does such a makeshift object provide for any controlled variation in the degree of openness which may be demanded by a particular cooking operation. Similarly, means that have in the past been utilized in lightweight picnic stoves of the charcoal-heated variety or the like, have not, up to the present time, been found satisfactory for use in the present application. For example, lightweight propping bars secured at the edge of the cover have not been effectively utilized in the present environment; neither have specialized hinged constructions, as might in theory permit the cover to be retained in a selected position. The reasons why prior art means of these types have not been found useful in stoves of the type cited herein are unclear, but may be due to the fact that the high weight evidenced by the massive covers utilized presents a very high hazard. This is particularly true in view of the high heat level developed at these covers (which are commonly aluminum); such factors demand a virtually foolproof means, if safety is to be assured.

In accordance with the foregoing it may be regarded as an object of the present invention to provide a propping device which, in a completely safe and dependable fashion, permits a user thereof to retain the cover of a ceramic radiator type barbeque stove at an intermediate open position.

It is a further object of the present invention, to provide a propping device for use in supporting the cover element of a ceramic radiator-type cooking stove, at a selectively determined position intermediate between a closed and completely opened position, which device does not interfere with access by the user to the cooking area, and which device may be readily and safely manipulated by the user during the course of cooking without subjecting such user to burning hazards.

It is a further object of the invention to provide a simple, dependable propping device, for use in retaining the massive cover element associated with ceramic radiator-type barbeque stoves, in a pre-determined open position, which device positively engages the elements being maintained in spaced relationship, thereby minimizing danger of slippage during use thereof, such as might present a hazard to individuals engaged in operation of the stove.

It is a yet further object of the invention, to provide a propping device for retaining the massive cover element of a ceramic radiator-type cooking stove in a partially open position, which device is of simple-low-cost construction, and which device is separate from the stove with which it cooperates, whereby the said device may be separately purchased and utilized without mechanically altering the stove with which it is to be employed.

SUMMARY OF INVENTION

Now in accordance with the present invention, the foregoing objects, and others as will become apparent in the course of the ensuing specification, are achieved by means of a propping device which serves to support the hinged cover of a ceramic radiator-type cooking stove at a partially open position. The device includes a propping body which is preferably elongated and provided at at least one end thereof with a cradle portion adapted to receive the front rim of either the cover or the underlying stove section. In one embodiment of the invention this cradle-like portion supports the rim cover, and the opposite end of the propping body in this case may adjoin a baseplate which is supportable at the oppositely disposed rim of the stove section.

In a further embodiment of the invention, the opposite end of the aforementioned oblong body, instead of adjoining a baseplate, may include a second cradle-like portion for engaging in like fashion the rim opposed to that engaged by the first cradle portion.

A handle extends outwardly from the body of the device for a distance sufficient to remove the handle end portion from the intense heat zone present at the stove opening. This handle terminates at a non-heat conductive grasping portion, thus enabling ready grasping of the device and manipulation by the user of the stove. The body portion of the device may be selectively adjustable in length as to enable stove openings of desired dimensions. In a preferred version of such an extensible embodiment, a central shaft may be secured to the baseplate of said device and an outer tubular sleeve portion bearing the cradle-like element at its distal end is vertically displaceable upon said shaft. In this embodiment the handle is threaded into a passage at the said tube, so that the inner end of the handle may engage the inner shaft. By rotating the handle, one may thereby lock the tubular sleeve at a desired vertical position. This thus enables ready adjustment of the length of the propping body in accordance with the dictates of the cooking environment.

BRIEF DESCRIPTION OF DRAWINGS

The invention is diagrammatically illustrated, by way of example, in the drawings appended hereto, in which:

FIG. 1 is a perspective view of a first embodiment of apparatus in accordance with the invention;

FIG. 2 is a fragmentary perspective view (partially broken-away) illustrating use of the FIG. 1 device to support at an open position the cover of a ceramic radiator-type cooking stove;

FIG. 2A is a view similar to FIG. 2, depicting an alternate mode of using the FIG. 1 device;

FIG. 3 is an elevational view depicting the opposite ends of a propping body for a second embodiment of the invention;

FIG. 4 is a fragmentary perspective view of a device similar to FIG. 1, but wherein the base portion thereof has been replaced by a receiving channel for the stove section rim;

FIG. 5 is a longitudinal section through an embodiment of the device enabling adjustment in length of the propping body;

FIG. 6 is a transverse cross-section of the FIG. 5 device, taken along the line 6—6 of FIG. 5;

FIG. 7 is a partial plan view of a further embodiment of the present device which enables adjustment in length of the propping body of the device; and FIG. 7A is a partial plan view of the FIG. 7 device, showing the device in a length-adjusted configuration.

DESCRIPTION OF PREFERRED EMBODIMENT

In FIG. 1 herein, a perspective view appears of a propping device 10 in accordance with the present invention. In the embodiment depicted device 10 is seen to include a base portion 12, to which is secured by welding, fastening, or other joining techniques, a propping body 14. The latter comprises a tubular member as, for example, of stainless steel or the like. Body 14 at its distal end 16 is formed into a cradle-like portion 18, the purpose of which will subsequently become apparent. The cradle-like portion 18 is a concavity which may be formed at the end of tubing 14 in any manner known in the art as, for example, by cutting or stamping the tube walls to define the arched shape shown. Alternatively cradle means 14 may, of course, comprise a separate element, secured to the said distal end 16.

Secured to the body 14 at a point somewhat below its mid-point, is a handle means generally designated at 19. The latter may include a connecting shaft 20 which is joined to the tubular body 14 as, for example, by being threaded into the wall thereof; or a metal fusion technique as, for example, welding or the like, may be utilized. The outer end of handle 19 carries an extended grasping portion 22, which comprises a material of very low heat conductivity, preferably wood or a plastic, or the like. As in use the body 14 of device 10 will be positioned adjacent an intense heat area of the stove with which the device is utilized, it is preferable that the total length of handle 19 be sufficient to remove the grasping portion 22 from the area of intense heating; preferably therefore the length of the handle is of the order of 1½ to 2½ times the length of propping body 14. Similarly, it will be noted that the base 12 is of relatively extensive dimensions. The advantage of the base being so configured will become apparent in connection with FIG. 2, the description of which is hereinbelow set forth.

In FIG. 2 herein, a simplified elevational view appears setting forth the manner in which the device of FIG. 1 is utilized to support the cover of the ceramic radiator-type cooking stove appearing therein. The said stove appears generally at 24. As stove 24 does not, per se, comprise the present invention, but merely serves as the environment in which the invention is utilized, the stove is not set forth with any great detail. A representative stove of this type incorporates ceramic rocks or the like, which rocks are heated by gas, electricity or other means to provide a radiant heat source for cooking at the grill surface mounted therein. This stove 24 is characterized by a lower stove section 28 which serves as the firebox, grill support, etc., and a cover 30 (partially broken-away) which is secured to section 28 by a hinge 32. While, as has been previously indicated, it is known to provide ventilation means as, for example, by means of vents at the top of cover body 30, it is general practice in use of stoves of this type to either fully open cover 30 to an essentially vertical position, or else close the cover body entirely during the cooking operation.

In accordance with the present invention, the device 10 is utilized by an operator grasping the portion 22 and preferably engaging the cover body rim 34 at cradle portion 18 of the device. At the same time the base portion 12 is brought to rest upon the opposed rim 36 of stove section 28. Under such conditions a sturdy propping support is provided between the cover 30 and the lower stove section 28. It will be appreciated that in the course of manipulating the device 10 as to achieve the most stable possible support, the grasping portion 22 will be moved back and forth in a generally vertical direction, as well as in a direction transverse thereto. If, as previously indicated, the cradle portion 18 is engaged with rim 34 it will be evident that base portion 12 can undergo a considerable degree of pivotal displacement about the engagement point between rim 34 and cradle means 18. Accordingly, it is desirable for base 12 to have dimensions of reasonable extent as previously indicated, in order to permit that degree of adjustment which may be necessary to secure the maximum stability of the propping device. Although not normally necessary, the bottom of plate 12 (which normally comprises a stainless steel or the like) may be provided with a roughened surface — as, for example, by being pitted or scored — to somewhat increase the frictional engagement between plate 12 and the abounding stove rim.

One of the advantages of the configuration of device 10 is that the upper edge 40 of connecting shaft 20 adjacent body 14, may serve as an alternate, lower position of support for rim 34. This aspect of the device is illustrated in the fragmentary view of FIG. 2A, which view is similar to FIG. 2. As seen therein the device 10 is supported on its base in a similar fashion to that described in connection with FIG. 2; however, the rim 34 of cover 30 is now supported at the indicated edge 40 of connecting shaft 20. Because of the relatively extensive dimensions of base 12, a stable position for the base is readily achieved by manipulation of grasping portion 22, in the manner previously discussed in connection with FIG. 2.

In FIG. 3, a partial elevational view appears of a further embodiment of the present invention. In the embodiment illustrated, a base element (as such base 12 appears in FIGS. 1 through 2A) is not present. Rather it is seen that the device 42, partially shown, consists of a propping body 44 which in addition to including an upper cradle portion 18 identical with the similarly numbered element described in connection with FIG. 1, includes a second cradle portion 46 at its opposite, lower end. The device 42 is otherwise similar to the embodiment of FIGS. 1 and 2; in particular, including a handle means of which only the connecting shaft 20 is partially seen. The device 42 is used in a manner similar to that described in connection with the embodiment of FIG. 1, except that in the present instance both the rim of the cover 30 and that of the lower stove section 28 are respectively received in cradle-portions 18 and 46.

In FIG. 4, a fragmentary perspective view appears of a further modified embodiment of the present device. In this instance the device 48 is similar to that described in connection with FIG. 3, except that the bottom end of propping body 52 is now adjoined to a receiving channel means 54. The latter comprises a generally U-shaped metal piece, the channel 55 of the U being defined by lateral walls 56 and 58 extending downwardly from the base 60 which adjoins body 52. In use, the channel means 54 may be slid over the rim of section 28 of the stove. The cover body 30 is then lowered until its rim engages the upper cradle portion of device 48. The handle, the shaft portion only of which is partially shown at 20, is located in a manner similar to that described in connection with FIG. 2, so as to enable adjustment of body 52, to permit engagement of cradle 18 with the descending rim of the stove cover. The walls 56, 58 are spaced sufficiently as to permit some pivotal movement about rim 34 during upward and downward adjustment of the handle.

In FIG. 5, a partial, longitudinal section is set forth through a further embodiment of the propping device of the invention, which embodiment enables an adjustment in length of the propping body. The device 62 shown in FIG. 5 includes a base 12 similar to that described in connection with FIGS. 1 and 2. Secured to base 12, as by welding or mechanical fastening, is a central shaft 64. A tubular sleeve 66, surrounds the said shaft and has sufficient clearance as to enable the sleeve 66 to be moved upwardly or downwardly upon the shaft 64. The upper end of tubular sleeve 66 carries the cradle portion 18 previously referred to. In the embodiment illustrated, connection shaft 20 of the handle for the device (the handle is not completely shown) is provided with a threaded end portion 68 which passes into and is threadingly engaged at the tapped hole 70 in the wall of sleeve 66. End portion 68 is of sufficient length that by advancing the handle to a sufficient rotational degree, portion 68 may engage the adjacent surface of shaft 64, thereby locking sleeve 66 at a desired vertical position with respect to the shaft. As may best be seen from the transverse cross-section of FIG. 6 (taken along the line 6—6 of FIG. 5) shaft 64 is preferably provided with a flat face 72 which may be engaged by the advancing end portion 68 of the handle to provide superior locking action; this feature also facilitates orientation of the axis of cradle portion 18 in the preferred direction for receiving the rim of the cover body therein (i.e., parallel to the rim). It should also be noted that the hole 70 provided in sleeve 66 is at a point close to the bottom of the sleeve. This is required in order to enable elevation of sleeve 66 over a reasonably large range.

In FIG. 7, a partial plan view appears of a further embodiment 81 of the present device, which enables adjustment in length of the propping body portion. The view depicted is in a direction looking inwardly along the handle. In order to clarify the action of this embodiment, the handle is not shown, except for the connecting shaft 20 — which is sectioned by a plane parallel to that of the drawing. It will be seen that in this embodiment the base 12 is provided with a shaft 74, similar to that described in connection with FIG. 5. In order to accommodate the desired variation in propping lengths, a sleeve 76 is provided, which is thus seen to be a tubular member, again formed at its upper end into a cradle portion 18 adapted for receiving the rim of the cover 30. A vertically directed elongated U-shaped slot 78 extends longitudinally from the bottom end 80 of sleeve 76, and is intersected by a plurality of cross-slots 84, 86, 88 at differing vertical heights.

Sleeve 76 is vertically slideable and partially rotatable upon shaft 74, and it will be clear that by engaging connecting shaft 20 of the handle within a selected cross-slot, the tubular sleeve 76 may be adjusted to a desired height. This aspect of the embodiment may be better appreciated by comparing FIG. 7A, showing device 72 adjusted for use at a mid-length extension. In this case the sleeve 76 has been rotated approximately one-quarter turn after having been first elevated as to align cross-slot 84 with handle 20. The various cross-slots as seen from FIG. 7A extend somewhat over 90° around the circumference of sleeve 76 from the edge of slot 78, in order to permit the axis of cradle means 18 to lie approximately perpendicular to handle 19 once the shaft 20 is brought to rest at the right-hand edge of the selected cross-slot.

While the present invention has been particularly set forth in terms of specific embodiments thereof, it will be evident in view of the present disclosure, that numerous variations upon the invention are now enabled to those skilled in the art, which variations, in propriety, yet reside within the scope of the invention. Accordingly, the invention is to be broadly construed, and limited only by the scope and spirit of the claims now appended hereto.

I claim:

1. A propping device for supporting the hinged cover of a ceramic radiator-type outdoor cooking stove at a partially opened position, with respect to the underlying stove section, comprising:

a baseplate for engaging the front rim of said stove;

a central shaft affixed to said baseplate and extending upwardly therefrom;

a tubular sleeve vertically slideable on said shaft, and having a concavity formed at the end thereof opposite said baseplate for receiving the front rim of said hinged stove cover; said sleeve having a tapped passage extending through the wall thereof; and an elongated handle means extending transversely from said sleeve and terminating in a non-heat conductor portion, whereby said device may be readily and safely manipulated by a user to effect engagement with said rims; the end of said handle means opposite said non-heat conductor portion being threaded and engaged with said tapped passage of said sleeve, whereby rotation of said handle means advances said threaded end through said sleeve wall to bear against said shaft and lock said sleeve at a desired vertical position with respect to said shaft, thereby enabling selective adjustment of the distance between said baseplate and sleeve concavity in order to maintain the said rims at a desired spacing with respect to one another.

2. A propping device for supporting the hinged cover of a ceramic radiator-type cooking stove at a partially opened position with respect to the underlying stove section, comprising:

a baseplate for engaging the front rim of said stove;

a central shaft affixed to said baseplate and extending upwardly therefrom;

a tubular sleeve vertically slideable and partially rotatable on said shaft, and having a concavity formed at the end thereof opposite said baseplate for receiving the front rim of said hinged stove cover; said sleeve having a vertical slot extending from the end thereof opposite said concavity, and a plurality of cross slots intersecting said vertical slot at differing vertical heights; and an elongated handle means extending in a direction transverse to said shaft and sleeve and terminating in a non-heat conductor portion, whereby said device may be readily and safely manipulated by a user to effect engagement with said rims; said handle means being joined to said support shaft by a connecting shaft portion passing through said slots, whereby said sleeve may be raised on said shaft and thereupon be rotated to engage said shaft portion with a selected cross slot, thereby locking said sleeve at a desired vertical height above said baseplate, to maintain the said cover and stove rims at a desired spacing with respect to one another.

* * * * *